United States Patent [19]

Edler et al.

[11] Patent Number: 5,079,198

[45] Date of Patent: Jan. 7, 1992

[54] CERAMIC PHASE IN SINTERED SILICON NITRIDE CONTAINING CERIUM, ALUMINUM, AND IRON

[75] Inventors: James P. Edler; Bohdan Lisowsky, both of Troy

[73] Assignee: Eaton Corporation, Cleveland, Ohio

[21] Appl. No.: 557,543

[22] Filed: Jul. 24, 1990

[51] Int. Cl.$^5$ .................... C04B 35/56; C04B 35/58
[52] U.S. Cl. .................................. 501/98; 501/97; 423/353
[58] Field of Search .................. 501/96, 97, 98; 423/353; 264/9

[56] References Cited

U.S. PATENT DOCUMENTS

| | | | |
|---|---|---|---|
| 2,268,589 | 1/1942 | Henny | 49/76.1 |
| 2,869,215 | 1/1959 | Smith | 25/156 |
| 3,205,080 | 9/1965 | Ryshkewitch | 106/44 |
| 3,222,438 | 12/1965 | Parr et al. | 264/66 |
| 3,669,723 | 6/1972 | Parr et al. | 117/105.2 |
| 3,819,786 | 6/1974 | May | 264/63 |
| 3,887,412 | 6/1975 | Styhr et al. | 156/89 |
| 3,950,464 | 4/1976 | Masaki | 264/65 |
| 3,991,166 | 11/1976 | Jack et al. | 423/327 |
| 3,992,497 | 11/1976 | Terwilliger et al. | 264/56 |
| 4,033,400 | 7/1977 | Gurwell et al. | 164/98 |
| 4,036,653 | 7/1977 | Jacobson | 106/47 R |
| 4,067,943 | 1/1978 | Ezis et al. | 264/86 |
| 4,119,689 | 10/1978 | Prochazka et al. | 264/65 |
| 4,164,528 | 8/1979 | Yajima et al. | 264/62 |
| 4,235,857 | 11/1980 | Mangels | 423/344 |
| 4,285,895 | 8/1981 | Mangels et al. | 264/65 |
| 4,354,990 | 10/1982 | Martinengo et al. | 264/65 |
| 4,356,136 | 10/1982 | Mangels | 264/65 |
| 4,376,742 | 3/1983 | Mah | 264/85 |
| 4,377,542 | 3/1983 | Mangels et al. | 264/65 |
| 4,410,636 | 10/1983 | Minjolle et al. | 501/98 |
| 4,443,394 | 4/1984 | Ezis | 264/65 |
| 4,471,060 | 9/1984 | Dickie et al. | 501/151 |
| 4,519,967 | 5/1985 | Crosbie et al. | 264/86 |
| 4,521,358 | 6/1985 | Miura et al. | 264/65 |
| 4,781,874 | 11/1988 | Edler | 264/65 |

FOREIGN PATENT DOCUMENTS

| | | |
|---|---|---|
| 076549 | 6/1977 | Japan . |
| 081250 | 5/1983 | Japan . |
| 3315508 | 12/1988 | Japan .................................. 501/97 |
| 779474 | 7/1955 | United Kingdom . |

OTHER PUBLICATIONS

Sacks, et al., Properties of Silicon Suspensions and Slip-Cast Bodies, 1985, 1109-1123.
Jahn, Processing of Reaction Bonded Silicon Nitride, 1989, 1-24.
Williams, et al., Slip Casting of Silicon Shapes and Their Nitriding, 1983, pp. 607-619.
Mangels, Effect of Rate-Controlled Nitriding and Nitriding Atmospheres on the Formation of Reaction-Bonded $Si_3N_4$, 1981, pp. 613-617.
Moulson et al., Nitridation of High-Purity Silicon, 1975, pp. 285-289.
Shaw et al., Thermodynamics of Silicon Nitridation: Effect of Hydrogen, 1982, pp. 180-181.
Moulson, Reaction-Bonded Silicon Nitride: Its Formation and Properties, 1979, pp. 1017-1051.

Primary Examiner—William R. Dixon, Jr.
Assistant Examiner—Alan Wright
Attorney, Agent, or Firm—P. S. Rulon; L. E. Cargill

[57] ABSTRACT

A body of sintered silicon nitride contains new non-glassy phases which produce significant X-ray diffraction peaks at 2-theta diffraction angles corresponding to d-spacings of about 2.86 Angstroms and 3.59 Angstroms and process for making same, which process includes (a) comminuting a slurry of a silicon-containing powder, water, about 0.1 to 5 volume percent of $Fe_2O_3$, about 0.1 to 5 volume percent $Al_2O_3$, and about 0.5 to 10 volume percent $CeO_2$, wherein all volume percents are based on the volume of the resultant silicon nitride, the composition of the slurry being such that about a 4 to 12 volume percent liquid phase is achieved during sintering; (b) reducing the water content of the reacted slurry to form a dry mass; (c) nitriding the dry mass by exposure to a nitriding gas at an elevated temperature to form silicon nitride; and (d) sintering the silicon nitride at about 1450°-2100° C.

3 Claims, No Drawings

CERAMIC PHASE IN SINTERED SILICON NITRIDE CONTAINING CERIUM, ALUMINUM, AND IRON

TECHNICAL FIELD

This invention relates generally to a non-glassy phase found in certain sintered silicon nitride compositions containing cerium, aluminum, and iron. This application also relates to co-pending applications entitled Process For Making Silicon Nitride Articles; Process For Preparing A Nitridable Silicon-Containing Material Having At Least One Densification Aid Including Alumina, And The Material Resulting Therefrom; Process For Preparing An Alpha-Phase Silicon Nitride Material And Thereafter Converting To Non-Densified Beta-Phase Material And The Material Resulting Therefrom; Process For Preparing A Densified Beta-Phase Silicon Nitride Material Having At Least One Densification Aid, And The Material Resulting Therefrom; Process For Nitriding Silicon-Containing Materials; and Process For Preparing A Base Nitridable Silicon-Containing Material And The Material Resulting Therefrom.

BACKGROUND OF THE INVENTION

Silicon nitride, with its high temperature strength, tribological properties, and chemical resistance is finding increasing interest and use in critical engineered applications, such as engine co ponentry, industrial pump components, cutting tools, and in refractory and electrical applications Reaction bonded silicon nitride is commonly prepared by reacting and nitriding silicon (either as a powder or as a formed article also known as a green body) with nitrogen by exposing the silicon to a nitrogen-containing atmosphere at temperatures of 1000° C. to about 1450° C. for times sufficient to produce the silicon nitride. For parts which require enhanced strengths, sintering and/or densification of the reaction bonded silicon nitride may be performed.

For improving the sintering process, various sintering aids have been used in the past. Sintering aids are generally added to the silicon powder before compacting into the green body for nitriding. The following prior art patents describe prior art attempts to enhance sintering.

U.S. Pat. No. 4,285,895 to Mangels et al. teaches that densified reaction bonded silicon nitride articles can be made by the incorporation of a densification aid into the reaction bonded silicon nitride article, surrounding the article with a packing powder of silicon nitride and densification aid and subjecting the article and powder mixture to a temperature above 1700° C. with a nitrogen atmosphere of sufficient pressure to prevent volatilization of the silicon nitride for a time sufficient to permit sintering of the reaction bonded silicon nitride articles.

Several methods for introducing the densification aid into the reaction bonded silicon nitride article are disclosed in the Mangels et al. patent. These include the impregnation of the densification aid into the reaction bonded silicon nitride article; incorporation of the densification aid into the packing powder and relying upon diffusion of the densification aid into the article at the sintering temperature; and incorporation of the densification aid into the silicon powder mix prior to nitriding. The densification aids cited are magnesium oxide, yttrium oxide, cerium oxide, and zirconium oxide. The patent also teaches that the nitrogen pressure at the sintering temperature may be in the range of 250 to 1500 psi.

U.S. Pat. No. 4,235,857, to Mangels teaches that silicon can be nitrided using a demand nitriding cycle over the temperature range of 900° C. to 1420° C. in an atmosphere consisting of a mixture of nitrogen, hydrogen and helium. The chemical composition of the nitriding gas is constantly changing during the nitridation of the silicon article, with the chemical activity of the nitrogen decreasing (partial pressure of nitrogen in the furnace decreases) as the temperature increases. The examples cited by Mangels have nitriding times of from 130 to 175 hours.

U.S. Pat. No. 4,351,787 to Martinengo et al. teaches that sintered silicon nitride articles can be prepared by forming a silicon powder mixture containing one or more sintering additives into a compact, the additives being present in the powder in an amount such as to ensure an additive content of from 0.5 to 20 wt % in the silicon nitride compact; heating the compact under a nitrogen gas blanket at a temperature not exceeding 1500° C. to convert the silicon into reaction bonded silicon nitride; and sintering the reaction bonded silicon nitride compact by heating in a nitrogen gas atmosphere at a temperature of at least 1500° C. Furthermore, it is taught that the silicon powder size is 0.1 to 44 microns in size and of high purity or containing only very small amounts of nitriding catalysts. The patent teaches that any conventional sintering additive may be used. Best results are said to be achieved by using MgO, and especially in combination with $Y_2O_3$. Other preferred additives mentioned in the patent are MgO, $Y_2O_3$, $CeO_2$, $ZrO_2$, BeO, $Mg_3N_2$, and AlN. Other examples of additives are given as $Mg_2Si$, $MgAl_2O_4$, and rare earth additions such as $La_2O_3$. Also iron can be used with advantage, usually in mixture with conventional additives such as MgO, $Y_2O_3$, and $CeO_2$.

Reference is made in the Martinengo et al. patent to the use of a conventional two-stage nitriding procedure at individual heating settings of 1350° C. and 1450° C., the two nitriding times generally being 16 to 32 hours at 1350° C. and 4 hours at 1450° C. in a nitrogen atmosphere. The examples given use an atmosphere of flowing nitrogen for a period of 100 hours, the temperature being gradually brought from 1100° C. to 1390° C. with periods of stay at intermediate temperatures. Furthermore, samples were sintered at 1700° to 1800° C. for times of 1 to 3 hours, using a protective powder consisting of a combination of $Si_3N_4$, BN, and various sintering aids.

As a final example of sintered reaction bonded silicon nitride practice, reference is made to U.S. Pat. No. 4,443,394 to Ezis which teaches a method for making a fully densified silicon nitride body. The basic principle taught is that silicon nitride will not sinter by itself, but requires a liquid phase at the sintering temperature. Ezis found that, by having an yttrium oxynitride and alumino-silicate liquid present at sintering temperatures of 1650° C.–1750° C., the need for an over pressure of nitrogen and cover or packing powder during sintering could be eliminated in order to densify the silicon nitride.

The Ezis patent teaches that, by (1) forming a nitridable mixture of: silicon powder, $SiO_2$ (carried with the Si metal , $Y_2O_3$ and $Al_2O_3$; (2) nitriding the mixture to form a reaction bonded silicon nitride, with consequent formation of a $Y_{10}Si_6O_{24}N_2$ phase, and an alumino-silicate which resides on the silicon nitride grains; and then (3) sintering in the 1650° C. to 1750° C. temperature range for 5-12 hours, a substantially fully densified silicon nitride is produced which exhibits a 4-point bending strength of 100,000 psi.

The Ezis patent further teaches the need for a long ball milling time of 48 hours, preferably dry, a nitridation cycle time of 200 hours, and sintering times of 5-12 hours. Total processing time including the milling can be estimated from the preferred embodiment as approximately 260 hours. This processing time is rather extensive and limits its commercial feasibility.

Many of the densification aids mentioned above or others used in the past are relatively expensive, are not always readily available, and require relatively high sintering temperatures for effectiveness.

In the process of arriving at an improved method for making a body of sintered silicon nitride which is (1) more commercially viable than prior art methods, (2) uses materials which are readily available, and (3) sinters at lower temperatures than typical prior art methods, a new non-glassy phase was found in certain sintered silicon nitride compositions.

SUMMARY OF THE INVENTION

In accordance with the invention, sintered silicon nitride is made which has a non-glassy phase which is characterized by significant X-ray diffraction peaks at 2-theta diffraction angles corresponding to d-spacings of about 2.86 Angstroms and 3.59 Angstroms. The sintered silicon nitride may be prepared by a method which begins with comminuting (i) a silicon-containing powder, (ii) water, (iii) about 0.5 to 5 volume percent $Fe_2O_3$, (iv) about 0.1 to 5 volume percent $Al_2O_3$, and (v) about 0.5 to 10 volume percent $CeO_2$, wherein all volume percents are based on the volume of the resultant silicon nitride. The composition of the comminuted mixture is such that about a total of 4 to 12 volume percent liquid phase is achieved during sintering, based on the total volume of the resultant silicon nitride. Comminution of the operative chemical compounds with water is conducted for a period of 1 to 5 hours, to produce a silicon based slurry. The nitriding agent and the densification aids may be added to the silicon-water slurry after comminution. Organic additives such as binders, plasticizers, viscosity modifiers, and dispersing agents may be added to the slurry toward the end of the comminution or thereafter. The slurry may then be aged for a period of 12 to 24 hours to allow the reaction of the silicon with the water to substantially reach completion which is believed to provide a silicon oxyhydride coating on the silicon. The aged slurry is then dried by spray drying or other technique and formed into a green body, if desired, such as by compaction of the spray-dried granules, slip casting of the original slip, extrusion, injection molding or other method. In addition, the nitriding agent and the densification aids may be added to the slurry after the aging step, if that is desirable. It may be advantageous to comminute the silicon and water first before deciding which agents and aids are desired.

The green body is then nitrided to form silicon nitride using a nitriding cycle which employs a nitriding gas of constant chemical activity composed of nitrogen, helium, and hydrogen gases, and uses a thermal heat treatment starting nitridation at a temperature of about 1000° C. and increasing the temperature at a constant rate of about 5° C. to 50° C. per hour to an upper temperature of about 1450° C. The green body may either be in the form of powder, or may be compacted into an article before nitriding.

Finally, the silicon nitride is sintered at a temperature of between 1450° C. and 2100° C. for a period of 0.5 to 5 hours in an atmosphere containing at least nitrogen which is at a pressure from ambient pressure to about 50 psig. Other sintering conditions are also contemplated, varying the heating, atmosphere, cooling and pressure conditions and materials included in the heating chamber.

Preferably, the method of preparing the article for sintering is that disclosed in two co-pending U.S. patent applications, the first being U.S. Patent application Ser. No. 135,864, "Process For Making Silicon Nitride" filed on Dec. 21, 1987, and the second being a continuation-in-part of the first, entitled Process For Making Silicon Nitride And Powder and Articles Made Therefrom filed on the same day herewith. Both co-pending applications are commonly assigned to the same assignee as the present application, and both co-pending patent applications are hereby incorporated by reference. In addition, the method of making sintered silicon nitride is disclosed in co-pending U.S. Patent Application entitled, "Process For Making Densified Beta-Phase Silicon Nitride Articles Or Powder" filed on the same day herewith and also hereby incorporated by reference.

DETAILED DESCRIPTION OF THE INVENTION

The invention relates to a new, non-glassy phase found in sintered silicon nitride compositions produced when using sintering aids which include cerium and aluminum oxides and an iron oxide nitriding agent. This new material is characterized in that it produces significant X-ray diffraction peaks at 2-theta diffraction angles corresponding to d-spacings of about 2.86 Angstroms and 3.59 Angstroms. The process of making the new silicon nitride body containing the nonglassy phase of this invention generally begins with comminuting a silicon-containing powder with the previously mentioned densification aids and nitriding agents in the presence of a large amount of water to form a slurry. The slurry components are generally employed in amounts such that the mixture consists of 10-60 volume % solids and 90 to 40 volume % water, wherein the solids substantially consist of the silicon-containing powder, $Fe_2O_3$, and densification aids. The silicon-containing powder may be commercial-grade silicon or alpha-phase silicon, or a mixture of both, and preferably has a particle size of less than 20 micrometers.

The densification aids of the present process include aluminum oxide ($Al_2O_3$) and cerium oxide ($CeO_2$) The aluminum oxide is preferably employed in amounts of about 0.1 to 5.0 volume percent, the $CeO_2$ is preferably employed in amounts of about 0.5 to 10 volume percent and the $Fe_2O_3$ is used in an amount from about 0.1 to 5 volume percent, wherein all volume percents are based upon the volume of the silicon nitride produced as a result of the conversion of the silicon metal to the silicon nitride powder. In a similar manner, alpha phase silicon nitride, in whole or in part may be substituted for the silicon metal with no adverse effect. The silicon-containing powder which is comminuted with the water may be substantially pure silicon powder, alpha-phase silicon nitride powder, or a mixture of both.

Organic materials, such as binders, lubricants, and viscosity modifiers, may be admixed with the silicon powder slurry which may afterward be compacted into a form before nitriding. Binders are included in the silicon powder mixture to provide sufficient integrity to a compacted green body and to allow machining of the green body before nitriding. Machining prior to nitriding or sintering has the significant benefit of machining while the part is in a softer stage, whereas, if machining is completed after nitriding or sintering, the machining is made more difficult because the silicon nitride part is extremely hard. Previously, silicon compacts had to be partially sintered or partially nitrided to provide them with a sufficient strength to allow machining without danger of breaking the piece. When proper amounts and types of binders are used, the pre-sintering or pre-nitriding is not necessary, thereby saving a step in the process.

Lubricants may be added (a) to make the plastic binders "softer" so that when a silicon-containing compact is formed, the plastic binder more efficiently bonds together to form a strong compact, (b) to lubricate the compact surface during machining operations so that the machine parts do not drag on the compacted part, and (c) to provide mold release characteristics to a compacted part so that the compacted part may be easily removed from the dies. Viscosity modifiers are added to assist in the pumping of the silicon slurry.

Any suitable comminution device may be used for comminuting, such as a ball mill, rod mill, vibratory grinder, Union Process grinder, jet mill, cone grinder, jaw crusher, or a hammer mill. The slurry is preferably prepared in a ball mill-type mixer which is 25-50 volume % filled with milling media and 75-50 volume % filled with the slurry.

The comminuting of the silicon-containing powder in the presence of water is an important step, as the comminuting creates fresh, unoxidized surfaces on the silicon powder particles for vigorous reaction with the water. Merely mixing silicon-containing powder, whether or not pre-ground, with water does not appear to create the fast, vigorous reaction that comminuting provides. Pre-ground silicon powder is not as reactive toward water because silicon, being a highly reactive metal, readily oxidizes in air during storage. Thus, a passivating layer of silicon oxide is formed on the outside of the silicon particles, thereby rendering the silicon not nearly as reactive as unoxidized silicon such as is created during the comminution step.

It is believed that the silicon is chemically reacting with the water during the aging step to form, at a minimum, a silicon oxyhydrate coating on the silicon particles and also releasing hydrogen gas as a product of the reaction.

After comminuting, the slurry is allowed to react further by aging the slurry. During aging, the slip appears to increase in volume by at least 50%, typically doubling its volume through frothing, and, subsequently, the frothing subsides after about 12 hours as the reaction nears completion and the slip develops thixotropic properties.

After aging, the reacted slurry is dried and formed, if desired, in preparation for the nitriding step. Although the slurry could be slip casted at this point to form a green body or dried to permit extrusion or injection molding of shapes, it is preferred to spray dry the slip to obtain a homogeneous free-flowing powder for isopressing or dry compression forming using standard powder metal presses. If binders are used, the compact will have a sufficient strength to allow machining without the need for special heat treatments for partially nitriding or sintering the silicon compact. Preferably, the compacting is completed before nitriding so that the machining is completed on the silicon part rather than on the harder silicon nitride part.

If the green body contains organic materials, such as binders, the green body is then placed in a furnace to burn off and volatilize the organics. The furnace is first purged with a combustible gas, such as hydrogen, and then heated. Preferably, this burn-off step is accomplished by heating the green bodies in a hydrogen atmosphere while the furnace temperature is increased from room temperature to about 6000° C.–1000° C. over about a two hour time period or for a sufficient length of time to volatilize substantially all of the organics. The heating rate during this portion of the cycle is controlled at a rate of about 500° C. per hour so as not to cause damage to the dry mass. The combustible gas flowing through the furnace is burned as it exits the furnace which is also effective to remove any organic binders from the furnace as they come out of the silicon compacts. Once the furnace temperature has reached the range of 600° C. to 1000° C., the combustible gas is then turned-off and the furnace is purged with nitrogen until a non-combustible gas mixture is left in the furnace whereupon the furnace atmosphere is replaced with the nitriding atmosphere. The volatile emissions and combustion products are nontoxic for the most part because carbon dioxide and water are the products given off when hydrogen is used as the combustible gas.

The nitriding of the silicon consists of exposing the part or powder to a nitrogen-containing nitriding gas at a sufficient temperature for a sufficient length of time to nitride the silicon. Although molecular nitrogen gas may be used for nitriding the silicon, it is preferred that the gas comprises a mixture of from about 40 percent to about 60 percent helium on a mole basis, from about 60 percent to about 40 percent on a mole basis of nitrogen, and from about 1% to about 4% on a mole basis of hydrogen wherein the total mole % of the helium, nitrogen, and hydrogen equals 100%.

Helium greatly enhances the thermal conductivity of the gas and that hydrogen, both for purging and as a member of the nitriding gas, enhances the reaction converting silicon to silicon nitride which is believed to be a vapor phase reaction. The pressure of the nitriding gas is preferably controlled so that it blankets the article under a slight positive pressure such as a gauge pressure of about 20 KPa, and pure nitrogen gas is admitted into the furnace to makeup for nitrogen consumed during the nitriding thereby attempting to maintain the initial partial pressures of the nitrogen, helium and hydrogen.

Once the nitriding atmosphere is in the furnace, an increasing temperature ramp, preferably substantially linear, of 5° C. to 50° C. per hour, preferably, 15° C. to 25° C., is initiated to run the furnace to a temperature of approximately 1400° C. to 1450° C., preferably 1420° C.

The methods of this invention and the inventions of the co-pending U.S. patent applications have the advantage of allowing relatively rapid, substantially linear, heating during nitridation (5° C. to 50° C. per hour). It is believed that two features of the invention of the co-pending patent applications help to prevent an overheating reaction from occurring. The first feature is the remaining presence of some reaction product from the silicon-water chemical reaction resulting from the comminution which remains in the silicon green body or powder during nitridation which is believed to reduce the reactivity of the silicon toward nitriding. The second feature is the use of helium in the nitriding gas. Helium has a relatively high thermal conductivity which is believed to greatly assist in removing the heat from the reaction site, thereby reducing the occurrence of localized silicon melting at hot spots of the reaction. A one-hour soak period at about 1420° C. is allowed before cooling to room temperature, if cooling is desired. The present invention and the inventions of the co-pending U.S. patent applications offer the benefit that the process is readily adaptable to a continuous type process using, e.g., a kiln similar to a tunnel kiln may be used instead of a batch kiln which is normally used in the manufacture of reaction bonded silicon nitride.

The silicon nitride part is then sintered by being exposed to a temperature of about 1450° C. to 2100° C., and preferably from about 1600° C. to 1900° C., which is maintained for a sufficient length of time to sinter the silicon nitride. The furnace temperature is preferably increased to about 1750° C., held at about 175° C. for up to 5 hours, and allowed to cool to room temperature. The atmosphere while sintering is preferably nitrogen at a pressure from atmospheric pressure to about 50 psig.

The sintered silicon nitride formed by the method described above contains a non-glassy phase which is characterized by significant X-ray diffraction peaks at 2-theta diffraction angles corresponding to d-spacings of about 2.86 Angstroms and 3.59 Angstroms. The diffraction analysis may be accomplished by an industry standard X-ray diffractometer.

The following examples are illustrative only and should not be construed as limiting the invention which is properly delineated in the appended claims.

EXAMPLE 1

Example 1 illustrates a procedure for making the new ceramic phase of this invention.

1000 grams of silicon, 30 grams of iron oxide ($Fe_2O_3$), 40 grams alumina ($Al_2O_3$), 200 grams of 96% ceria (Molycorp grade 5310 $CeO_2$) and 1000 milliliters of distilled water were comminuted in an Il.3 liter porcelain jar mill using 7 kg of ¾ inch diameter alumina balls for 3 hours. Organic binders and viscosity modifiers consisting of 15 grams of polyvinyl alcohol, 5 grams of polyethylene glycol, 10 grams of glycerol, and 2.5 grams of xanthan gum and 270 ml of distilled water were then added to the mill, and comminution was continued for an additional hour before the slurry was separated from the balls. Total comminution to of the silicon with the water was 4 hours. Two additional batches of the silicon-ceria-iron oxide-alumina-water slurry were prepared in an identical manner, and the slurries were combined and allowed to age for approximately 16 hours. The combined slurries were then spray-dried to obtain a free-flowing granular powder using a Pentronix Dryer, operated at a rotor speed of 8200–8300 rpm, an inlet temperature of 295° C., and an outlet temperature of 90° C. Upon nitridation, this powder was expected to have approximately 7.7 volume % liquid forming agents and 92.3 volume % silicon nitride as computed in the following example calculations:

Volume of $Si_3N_4$ $$(3000 \text{ gm Si}) \frac{(1 \text{ mole Si})}{(28 \text{ gm Si})} \frac{(1 \text{ mole } Si_3N_4)}{(3 \text{ mole Si})} \frac{(140 \text{ gm } Si_3N_4)}{(\text{mole } Si_3N_4)}$$

$$\frac{(1 \text{ cc } Si_3N_4)}{(3.2 \text{ gm } Si_3N_4)} = 1562.5 \text{ cc } Si_3N_4$$

Volume of Liquid Forming Agents:

Volume $Fe_2O_3$ $$(90 \text{ gm } Fe_2O_3) \frac{(1 \text{ cc } Fe_2O_3)}{(5.24 \text{ gm } Fe_2O_3)} = 17.2 \text{ cc } Fe_2O_3$$

Volume $CeO_2$

Note: At the sintering temperature, the active phase of $CeO_2$ is $Ce_2O_3$ and $2 CeO_2 \rightleftharpoons Ce_2O_3 + \frac{1}{2} O_2$
Therefore:

$$(600 \, CeO_2) \frac{(1 \text{ mole } CeO_2)}{(1.72 \text{ gm } CeO_2)} \frac{(1 \text{ mole } Ce_2O_3)}{(2 \text{ mole } CeO_2)} \frac{(328 \text{ gm } Ce_2O_3)}{(1 \text{ mole } Ce_2O_3)}$$

$$\frac{(1 \text{ cc } Ce_2O_3)}{(6.86 \text{ gm } Ce_2O_3)} = 83.4 \text{ cc } Ce_2O_3$$

Volume $Al_2O_3$ $$(120 \text{ gm } Al_2O_3) \frac{(1 \text{ cc } Al_2O_3)}{(3.965 \text{ gm } Al_2O_3)} = 30.3 \text{ cc } Al_2O_3$$

Total Volume of Liquid Forming Agents:
17.2 cc $Fe_2O_3$ + 83.4 cc $Ce_2O_3$ + 30.3 cc $Al_2O_3$ = 130.9 cc Liquid Forming Agents Total Volume of $Si_3N_4$ and Liquid Forming Agents:
1562.5 cc $Si_3N_4$ + 130.9 cc Liquid Forming Agents = 1693.4 cc Volume Percent Of Liquid Forming Agents $$\frac{130.9 \text{ cc Liquid Forming Agents}}{1693.4 \text{ cc Total}} \times 100\% = 7.73\%$$

Volume Percentage of each Constituent:

Iron Oxide ($Fe_2O_3$)

$$\frac{17.2 \text{ cc } Fe_2O_3}{1693.4 \text{ cc total}} \times 100\% = 1.0\%$$

Ceria ($Ce_2O_3$)

$$\frac{83.4 \text{ cc } Ce_2O_3}{1693.4 \text{ cc total}} \times 100\% = 4.9\%$$

Alumina ($Al_2O_3$)

$$\frac{30.3 \text{ cc } Al_2O_3}{1693.4 \text{ cc total}} \times 100\% = 1.8\%$$

The ceria used was about 96% pure ceria and about 4% other rare earth oxides, principally lanthanum oxide (typically about 3%) and neodymium oxide (typically about 1.5%). Since these oxides would also constitute appropriate liquid forming agents and have densities similar to ceria, the slight error incurred by ignoring their presence is considered negligible.

The spray-dried powder was then pressed into modulus of rupture (MOR) test bars of dimension 0.375 inches by 0.170 inches by 3.5 inches using an industry-standard powder metal press. The bars were subsequently cut to approximately 2.5 inches prior to nitriding.

The MOR bars were placed in a nitriding furnace which was evacuated to remove the ambient atmosphere. The furnace was then backfilled with hydrogen gas which also flowed continuously through the furnace. The temperature of the furnace was raised linearly from room temperature to 1000° C. over a 2-hour period. At approximately 960° C., the furnace was purged with helium to remove the hydrogen, and then the furnace was evacuated. The furnace temperature was held at 1000° C. for a proximately 1 hour for the evacuation to be completed, and, during which time, the nitriding atmosphere consisting of approximately 50 mole % helium, 2 mole % hydrogen and 48 mole % nitrogen was admitted to the furnace. The furnace pressure was brought to approximately 4–5 psig, and the nitridation of the silicon was begun. The temperature of the furnace was raised from 1000° C. to 1430° C. over a 32-hour period with a 1-hour hold at 1430° C., before cooling the furnace back down to room temperature. Nitrogen gas was automatically admitted to the furnace as it was consumed during the formation of the silicon nitride so that the chemical composition of the nitriding gas was kept constant throughout the nitridation process.

Twenty-four of the nitrided MOR bars were loaded into reaction bonded silicon nitride setter boxes, described in the co-pending application "Use of RBSN Setters For The Sintering Of Silicon Nitride Ceramics As An Alternative For Cover Powder". The MOR bars were placed on RBSN supports to hold them during sintering. No cover powder was employed. The setter boxes containing the MOR bars were loaded into a graphite furnace. The furnace was evacuated and purged several times with nitrogen to remove any ambient atmosphere, then the furnace was heated from room temperature to 1725° C. linearly over a 3-hour period. The furnace was kept at approximately 1725° C. for 4 hours and then cooled to room temperature. Nitrogen gas at slightly greater than atmospheric pressure was flowed through the furnace throughout the sintering cycle. The MOR bars were easily removed from the setter boxes, and no adhesion of the bars to the RBSN supports was evident. The 24 sintered MOR bars were sent to Bomas Machine Specialties, Inc., Sommerville, MA, for finish grinding into test bars, and subsequently tested in 4-point bending tests at Coors Analytical Laboratories, Golden, CO. The test results are shown in Table 1.

TABLE 1

| Density Avg. (gm/cc) | M.O.R. Avg. (Kpsi) | MOR Range (Kpsi) | # of Bars |
|---|---|---|---|
| 3.35 | 80 | 63–96 | 24 |

Two of the test bars, samples 7 and 8, of the sintered silicon nitride from Example 1 were subjected to X-ray diffraction analysis directly on the surface of the ground bars. X-ray diffraction scans were obtained from the sample using a Scintag Pad X thetatheta diffractometer under the following analytical conditions: copper tube operated at 45 KV, 40 MA: goniometer radius 250 mm; beam divergence ½°; scatter slit 0.5 mm, receiving slit 0.2 mm; germanium solid state detector bias 1000 V; PHA set to accept only K-alpha radiation; scan speed 2° 2-theta per minute; chopper increment 0.05° 2-theta; scan range 5° to 90° 2-theta; sample mounted with clay directly on the multiple sample changer stub; no sample spin. By the X-ray diffraction analysis, both samples indicated significant beta-phase silicon nitride was present along with extra unidentifiable phases. One major unidentifiable non-glassy ceramic phase was evidenced in each of the two test bars by an X-ray diffraction peaks at 2-theta diffraction angles corresponding to d-spacings of about 2.86 Angstroms and 3.59 Angstroms.

Table 2 provides the amounts of the various phases in samples 7 and 8. Each sample contains a major amount of beta-silicon nitride along with additional phases. The extra phases found in these samples could not be identified by standard tables, e.g., JCPDS standards file. Both samples contain a similar series of peaks indicating at least one additional phase being present in both samples. Sample 7 contains a series of weak peaks not found in sample 8 which indicates there is a small amount of another phase or phases in sample 7 that are not found in sample 8.

TABLE 2

| Phase | Sample 7 Phase Amount (%) | Sample 8 Phase Amount (%) |
|---|---|---|
| Beta-Phase $Si_3N_4$ | Balance | Balance |
| Unidentified Phases 1 | 32 | 21 |
| Unidentified Phases 2 | 3 | Not Detected |
| Amorphous | 5–15 | 5–15 |

Tables 3 and 4 list the major non-standard peaks for samples 7 and 8, respectively. The peaks which belonged to the beta silicon nitride pattern are not included in the Tables. All the listed peaks belong to unidentified phases. As shown in Tables 2 and 3, significant diffraction peaks at d-spacings of about 2.86 Angstroms, 49.2% of maximum peak intensity in sample 7 and 23.8% of maximum peak intensity in sample 8, and at d-spacing of about 3.59 Angstroms, 9.4% of maximum peak intensity in sample 7 and 5.1% of maximum peak intensity in sample 8, are common to both samples 7 and 8. This indicates the presence of a new

TABLE 3

MAJOR NON-BETA SILICON NITRIDE PEAKS FOR SAMPLE 7

| Peak # | 2TH-OBS[a] | d-Spacing Observed | % Peak Intensity Relative To Highest Peak of 33,660 cpm[b] |
|---|---|---|---|
| 9 | 24.779 | 3.5902 | 9.4 |
| 10 | 25.767 | 3.4548 | 5.7 |
| 14 | 29.065 | 3.0697 | 7.5 |
| 15 | 31.261 | 2.8590 | 49.2 |
| 20 | 37.800 | 2.3781 | 4.1 |
| 24 | 43.387 | 2.0473 | 4.6 |
| 25 | 44.204 | 1.9857 | 4.3 |
| 26 | 45.650 | 1.8158 | 4.3 |
| 32 | 50.203 | 1.7669 | 12.1 |
| 34 | 51.693 |  | 6.4 |

[a]2TH-OBS = 2-theta observation position (degrees)
[b]d-Spacing - obs. = calculated d-Spacing based on 2-theta angle observed
[c]% Peak Intensity was determined by the equation:

% Peak Intensity = $\frac{\text{Peak Intensity}}{33,600^*} \times 100\%$.

*33,660 counts per minute was the peak intensity of the highest peak in the diffraction (Peak #18 of the standard peaks, 2TH-OBS:33,950)

TABLE 4

MAJOR NON-BETA SILICON NITRIDE PEAKS FOR SAMPLE 8

| Peak # | 2TH-OBS[a] | d-Spacing Observed | % Peak Intensity Relative To Highest Peak of 46,620 cpm[b] |
|---|---|---|---|
| 4 | 22.500 | 3.9484 | 4.9 |
| 6 | 24.800 | 3.5872 | 5.1 |
| 7 | 25.172 | 3.5350 | 4.9 |
| 9 | 28.500 | 3.1294 | 4.2 |
| 11 | 31.270 | 2.8581 | 23.8 |
| 19 | 42.479 | 2.1263 | 4.0 |
| 21 | 45.545 | 1.9901 | 5.4 |
| 25 | 49.154 | 1.8521 | 4.8 |

TABLE 4-continued
MAJOR NON-BETA SILICON NITRIDE PEAKS FOR SAMPLE 8

| Peak # | 2TH-OBS[a] | d-Spacing Observed | % Peak Intensity Relative To Highest Peak of 46,620 cpm[b] |
|---|---|---|---|
| 27 | 50.726 | 1.7983 | 4.4 |

[a]2TH-OBS = 2-theta observation position (Angstroms)
[b]d-Spacing observed = calculated d-spacing based on 2-theta angles observed
[c]% Peak Intensity was determined by the equation:

$$\% \text{ Peak Intensity} = \frac{\text{Peak Intensity}}{46{,}620^*} \times 100\%.$$

*46,620 counts per minute was the peak intensity of the highest peak in the diffraction (Peak #8 of the standard peaks, 2TH-OBS:27,400)

While our invention has been described in terms of a specific embodiment, it will be appreciated that other embodiments could readily be adapted by one skilled in the art. Accordingly, the scope of our invention is to be limited only by the following claims.

What is claimed is:

1. A body of sintered silicon nitride, comprising a non-glassy phase which produces significant X-ray diffraction peaks at 2-theta diffraction angles corresponding to d-spacings of about 2.86 Angstroms and 3.59 Angstroms, said body prepared by the method including:
   (a) comminuting a slurry comprising a mixture of
      (i) a silicon-containing powder selected from the group consisting of commercial grade silicon, substantially pure silicon powder, alpha phase silicon nitride and mixtures thereof,
      (ii) water,
      (iii) about 0.5 to 5 volume percent of a nitriding agent, $Fe_2O_3$, based on the volume of the resultant silicon nitride,
      (iv) about 0.1 to 5 volume percent, of a densification aid, $Al_2O_3$, based on the volume of the resultant silicon nitride, and
      (v) about 0.5 to 10 volume percent of a densification aid, $CeO_2$, based on the volume of the resultant silicon nitride,
   the $Fe_2O_3$, $Al_2O_3$, and the $CeO_2$ being employed in amounts to achieve about a total 4 to 12 volume percent of both nitriding agent and densification aids base don the volume of the resultant silicon nitride,
   the slurry components being employed in amounts such that the slurry contains about 10 to 60 volume percent solids and about 90 to 40 volume percent water,
   the comminuting being performed to form fresh, non-oxidized surfaces on the silicon powder and to allow substantial chemical reaction between the silicon and the water;
   (b) reducing the water content of the reacted slurry to a degree sufficient to form a dry mass;
   (c) nitriding the dry mass by exposure to a sufficient amount of a nitriding gas including at least nitrogen at a sufficient temperature for a sufficient length of time to form a mass of substantially silicon nitride, and
   (d) sintering the silicon nitride mass at about 1450° C. to 2100° C. for a sufficient length of time to convert the silicon nitride from a predominantly alpha-phase material to a predominantly beta-phase silicon nitride material.

2. The body of claim 1, wherein said silicon-containing powder includes a mixture of substantially pure silicon powder and alpha-phase silicon nitride powder.

3. The body of claim 2, wherein said nitriding agent, $Fe_2O_3$ and said densification aids, $Al_2O_3$ and $CeO_2$, are added to the slurry after the silicon-containing powder and water have been comminuted.

* * * * *